3,150,182
PURIFICATION BY COPPER OF AROMATIC ACIDS PREPARED BY SULFUR CONTAINING OXIDANTS IN THE PRESENCE OF AMMONIA
John J. Brodbeck and John B. Wilkes, Albany, Calif., assignors to California Research Corporation, San Francisco, Calif., a corporation of Delaware
No Drawing. Filed Jan. 4, 1962, Ser. No. 164,400
12 Claims. (Cl. 260—553)

This invention relates to a novel method of improving the quality of dibasic aromatic acids. More particularly, this invention relates to the removal of discoloring impurities from said acids.

Dibasic aromatic acids which contain discoloring impurities are commercially unacceptable for a variety of applications. The acids obtained by the oxidation of alkyl substituted aromatics using sulfur-ammonia type reagents are found to contain small amounts of color bodies as impurities, which probably include organic sulfur containing compounds. These impurities not only discolor the acids, but even when removed to the extent that they are no longer visibly apparent in the acids, may subsequently discolor products made from the acids. For fine grade fibers, an extremely color-free form of acid is essential.

It has now been found that discoloring contaminants may be removed by heating the crude dibasic amide, that is, the reaction mixture which consists of acid, mono- and diamide and ammonium salt, the precursors to the dibasic acid, with copper or a cuprous salt and, preferably, copper freshly reduced by a reducing metal. The copper and other metals may then be removed and the purified reaction mixture hydrolyzed to yield the desired acid. While this simple process does provide a significantly purer product, minor variations are found to enhance the removal of impurities.

The crude dibasic amide contains as its major components diamide, monoamide, ammonium salts of the acid. Copper or its salt is then introduced into the mixture which may be preheated to the desired temperature or may be heated after the addition of the copper. Carbon may be added to the mixture at any time. Its presence, while not essential, does improve the effectiveness of the copper treatment. After the treatment, the carbon, if present, may be filtered off, the copper removed and the reaction mixture hydrolyzed to pure acid. While it is not known why this particular metal aids in the removal of disclosing impurities, the results would appear to indicate that the copper reacts with the impurities in a reductive manner.

The purification is operable for any dibasic acid obtained by oxidation of an aromatic hydrocarbon by a sulfur-ammonia type oxidant, i.e., ammonia plus sulfur, sulfate, thiosulfate, bisulfite, etc. As examples of acid amides—by amides it is intended to include mono- and diamides and ammonium salts—which are operable are the 1,4-naphthadioic amide, 1,6-naphthadioic amide, biphenyl-4.4'-dicarboxamide, terephthalic amide, isophthalic amide, etc. While polynuclear aromatic bibasic acids may be used in this process, the mononuclear aromatic dibasic acids are preferred, i.e., phthalic, isophthalic, and terephthalic, with particular preference for the latter two acids.

Copper metal, preferably in a finely divided state, may be used. However, it has been found advantageous that the copper be freshly prepared by reduction of a copper salt in situ. Some cuprous ion may also be present. While any of the usual metals for reducing copper may be used, zinc is preferred.

The zinc metal used for the purification may be in any form, but is most efficient when used as a fine powder. The greater the surface area, the more rapid and efficiently the zinc is utilized. Any water soluble copper (II) salt may be used in the purification, e.g., copper chloride, copper sulfate, etc.

The mol ratio of the zinc to copper (II) may vary widely, e.g., from about 1:9 to about 9:1; however, mol ratios in the range about 1:4 to about 4:1 are preferred, with the highest efficiency at about 6:4.

The total amount of zinc and copper (II) used will vary depending on the amount of contaminants in the "crude amide" and the quality of acid desired. An amount of metals as little as 0.01% by weight of potential acid values, i.e., the total weight of materials that may form acid on hydrolysis, amide, ammonium salt, the acid itself, etc., has demonstrated a detectable improvement in the product and increasing amounts have provided a further increase in quality. While any amount of the copper metals may be used, combined amounts will ordinarily not exceed 10% by weight of the potential acid values.

The temperature of the treatment will usually be at least 70° F. No advantage is obtained by increasing the temperature above 500° F. and temperatures in the range 160°–250° F. are preferred. The reaction time will depend on the physical form of the metals. When finely divided zinc and copper salt are used, the reaction may occur in a few seconds, sometimes somewhat more slowly. Therefore, this form of the metal is preferred.

All the zinc and copper (II) to be used may be added simultaneously or at intervals in the desired proportion. Either metal may be added first, but better results are obtained when the zinc and copper (II) are added together. Best results are obtained when the zinc-copper (II) are slowly added at a constant rate to the crude amide.

Any cuprous salt may be used in this invention. Cuprous halides, e.g., cuprous chloride, cuprous bromide, which are easily obtained are preferred.

The purification should not be run in the presence of air, since oxygen reduces its effectiveness. It is necessary, therefore, to carry out the purification in an inert atmosphere, e.g., nitrogen, argon, etc.

While not essential to the purification, the presence of hydrogen enhances the quality of the product. It has been found effective to merely bubble hydrogen through the crude mixture. Besides supplying a source of hydrogen, the bubbling may also serve as a method of agitation. Since the presence of hydrogen does provide a better quality final product, it is a preferred embodiment.

Any active form of carbon may be used in this process. Adsorbent charcoal finds frequent use because of its availability and cheapness. The activated charcoal may be added at any time, but is most effective when present after the treatment with the metals. The amount of carbon is not critical and will usually vary between 0.1–5% by weight of the potential acid values.

After the treatment, the metals may be removed in a variety of ways, i.e., ion exchange resins, Versenes, etc. the most practicable being precipitation with hydrogen sulfide and then filtration. If hydrogen sulfide is used for removal, it is preferable to remove all the hydrogen sulfide, prior to hydrolysis of the amide. This may be simply and practicably done by steam stripping.

The purification may be carried out batchwise or in a continuous process.

The following examples will serve to further illustrate the invention and are not intended as limitations.

EXAMPLE I

To 1750 ml. of crude isophthalic amide (A)[1] heated

[1] The letters indicate the various batches of crude isophthalic amide.

to 200° F. under nitrogen was added 3.5 g. zinc dust and 3.5 g. copper sulfate 5H₂O with stirring. The solution was then maintained at 200° F. After one hour, 14 g. carbon was added, the mixture stirred for an additional one-half hour, the carbon filtered off, the metals precipitated from solution with hydrogen sulfide, and the metal sulfides removed by filtration.

Sulfuric acid was then added to obtain a pH 2 and the solution heated at 420° F. for one hour to hydrolyze the amide. The solid which separated was filtered and washed at 200° F., then slurried in 1400 ml. of a sodium bisulfate solution, heated at 420° F. for an hour to ensure complete hydrolysis, and the solid acid was then filtered, washed and dried at 200° F.

The isophthalic acid obtained had a UV percent transmission: at 4000 A. of 90.0; at 3400 A. of 15.0. All the UV determinations were made with 0.5 M solution in 3 N sodium hydroxide in a 5 cm. cell.

The following examples were carried out in a similar manner to Example I, with any variations indicated in the table:

When 3.5 g. of magnesium was used according to the procedure of Example VI on isophthalic amide (E), the resulting isophthalic acid had a UV transmission: at 4000 A. of 91.9; at 3400 A. of 12.4.

When the same amide was used without the metals and carried through the procedure of Example VI, the isophthalic acid obtained had a UV transmission: at 4000 A. of 86.0; at 3400 A. of 0.0.

EXAMPLE IX

Crude isophthalic acid amide (300 ml.) (E) was heated to 200° F. under nitrogen, while hydrogen was bubbled through the solution. Copper (6 g.) was added and the solution maintained at 200° F. for 60 minutes. After this time, 2.4 g. of activated charcoal was added and the solution maintained at 200° F. for an additional 30 minutes. The carbon was then filtered off, the metals precipitated with hydrogen sulfide, and then also filtered off.

Sulfuric acid was then added to obtain a pH 2 and the solution heated at 420° F. for one hour to hydrolyze the amide. The solid which separated was filtered and

*Table I*

| | Crude amide sample | No. of treating stages | Treating conditions per stage | | | | | UV transmission, percent | |
|---|---|---|---|---|---|---|---|---|---|
| | | | Weight percent of isophthalic amide¹ | | | Temp., °F. | Time, Min. | 3400 A. | 4000 A. |
| | | | Zinc | CuSO₄·5H₂O | Carbon | | | | |
| II | A | 1 | 1.0 | 1.0 | 4.0 | 465 | 90 | 31.2 | 92.2 |
| III | A | 4 | 1.0 | 1.0 | 1.0 | 200 | 10 | 49.6 | 93.5 |
| IV | B | 1 | 4.0 | 4.0 | 4.0 | 200 | 50 | 39.4 | 88.0 |
| V | B | 1 | 0.0 | 0.0 | 4.0 | 200 | 30 | 0.0 | 85.3 |

¹ Potential acid values of isophthalic acid.

The following examples illustrate the use of hydrogen:

EXAMPLE VI

Crude isophthalic amide (C) (1750 ml.) was heated to 200° F. under nitrogen while hydrogen was bubbled through the solution. A mixture of 14 g. zinc dust and 14 g. copper sulfate·5H₂O was added slowly over a period of one hour; fourteen grams of carbon were then added, the mixture stirred for an additional one-half hour, the carbon filtered off, the metals precipitated from solution with hydrogen sulfide, and the metal sulfides removed by filtration.

Sulfuric acid was then added to obtain a pH 2 and the solution heated at 420° F. for one hour to hydrolyze the amide. The solid which separated was filtered and washed at 200° F. then slurried in 1400 ml. of a sodium bisulfate solution, heated at 420° F. for an hour to ensure complete hydrolysis, and the solid acid was then filtered, washed and dried at 200° F.

The isophthalic acid obtained had a UV transmission: at 4000 A. of 92.1; at 3400 A. of 44.6.

The following examples are a tabular comparison of isophthalic acid purified in a similar manner to Example VI, and isophthalic acid which was not treated with the metals.

washed at 200° F. slurried in 240 ml. of a sodium bisulfate solution, heated at 420° F. for an hour to ensure complete hydrolysis, and the solid acid was then filtered, washed and dried at 200° F.

The isophthalic acid obtained had a UV transmission: at 4000 A. of 87.0; at 3400 A. of 35.4.

When cuprous chloride (6 g.) instead of copper was used in the above procedure, the isophthalic acid obtained had a UV transmission: at 4000 A. of 92.5; at 3400 A. of 37.5.

The purity of the isophthalic acid may be correlated with the UV absorption, particularly at 3400 A. Another standard of purity is the Hazen number of the polyester obtained according to the following method from the isophthalic acid. The subsequent table is a comparison of polyesters obtained with and without purification with zinc-copper (II).

EXAMPLE A

A mixture of 208 g. isophthalic acid, 194 g. fumaric acid, 248 g. diethylene glycol, 44.6 g. ethylene glycol, 0.59 g. triphenyl phosphite and 0.08 g. hydroquinone was heated at the rate of 5° F./minute to 446° F. while maintaining the overhead condenser temperature below 105° F. The mixture was maintained at 446° F. for 3 hours

*Table II*

| | Crude amide sample | No. of treating stages | Treating conditions per stage | | | | | UV transmission, percent | |
|---|---|---|---|---|---|---|---|---|---|
| | | | Weight percent of isophthalic amide | | | Temp., F. | Time, Min. | 3400 A. | 4000 A. |
| | | | Zinc | CuSO₄·5H₂O | Carbon | | | | |
| VII | D | 4 | 0.5 | 2.0 | 1.0 | 200 | 60 | 70.0 | 92.4 |
| VIII | D | 4 | 0.0 | 0.0 | 1.0 | 200 | 30 | 12.4 | 77.8 | and 55 minutes under nitrogen, increasing the flowrate of nitrogen from 4 l./hr. to 15 l./hr. after the mixture turned clear.

When the overhead temperature dropped to 75°, the nitrogen flowrate was increased to 23 l./hr. The finished resin was then cooled to 370° F. and diluted with styrene to 70% nonvolatile materials, the temperature being maintained at 180–190° F. Sufficient hydroquinone was present in the styrene to have 165 ppm. hydroquinone in the resulting solution. The resins were then checked for their Hazen color.

*Table III*

| Isophthalic acid: | Hazen color [1] |
|---|---|
| Without metal treatment | [2] 135–195 |
| VII | 75 |

[1] ASTM Test Method D-1209-54, vol. 8, 1958, p. 538.
[2] A variety of samples comprise this range.

A significant improvement in polymer quality is evident over the best polymers obtained in the absence of metals treatment.

As will be evident to those skilled in the art, various modifications on this process can be made or followed, in the light of the foregoing disclosure and discussion, without departing from the spirit or scope of the disclosure or from the scope of the following claims.

We claim:
1. In a method of purifying dibasic aromatic amides containing sulfur impurities wherein said dibasic aromatic amide is obtained by oxidation of an aromatic hydrocarbon with a sulfurammonia type oxidant, the improvement which comprises treating, in a relatively oxygen-free atmosphere, at a temperature of about 70° to 500° F., a mixture of the crude amide with copper of valence from 0 to 1, said copper being in amount at least 0.1% by weight of the potential acid values of said crude amide, removing the copper and recovering the purified product.

2. In a method of purifying dibasic aromatic amides containing sulfur impurities wherein said dibasic aromatic amide is obtained by oxidation of an aromatic hydrocarbon with a sulfurammonia type oxidant, the improvement which comprises treating, in a relatively oxygen-free atmosphere, at a temperature of about 70° to 500° F., a mixture of the crude amide with zinc metal and a copper salt, said zinc metal and copper salt being in total amount at least 0.1% by weight of the potential acid values of said crude amide, removing the metals and recovering the purified product.

3. A process according to claim 2 wherein the zinc-copper salt mol ratio is in the range 9:1 and 1:9.

4. A process according to claim 1 wherein the treatment is carried out in the presence of hydrogen.

5. A process according to claim 2 wherein the treatment is carried out in the presence of hydrogen.

6. In a method of purifying dibasic aromatic amides containing sulfur impurities wherein said dibasic aromatic amide is obtained by oxidation of an aromatic hydrocarbon with a sulfurammonia type oxidant, the improvement which comprises treating, in a relatively oxygen-free atmosphere, at a temperature in the range of about 160° to 250° F. a mixture of the crude amide with copper of valence from 0 to 1, said copper being in amount at least 0.1% by weight of the potential acid values of said crude amide, treating the solution with activated carbon, removing the metal and carbon, and recovering the purified product.

7. A process according to claim 6 wherein said copper is obtained by the combination of a copper salt and zinc metal, said copper salt and zinc metal being in total amount at least 0.1% by weight of the potential acid value of said crude amide.

8. A process according to claim 6 wherein said copper of valence 1 is cuprous chloride.

9. A process according to claim 6 wherein said dibasic aromatic amide is isophthalic amide.

10. A process according to claim 6 wherein said treatment is repeated a plurality of times.

11. In a method of purifying dibasic mono-nuclear aromatic amides obtained by oxidation, of an aromatic hydrocarbon with a sulfur-ammonia type oxidant, the improvement which comprises treating, in a relatively oxygen-free atmosphere, at a temperature in the range of about 160° to 250° F., a mixture of the crude amide with zinc metal and a water soluble copper salt, said zinc metal and copper salt being in total amount at least 0.1% by weight of the potential acid values of said crude amide, removing the metals and recovering the purified product.

12. A process according to claim 11 wherein said copper salt is cupric chloride.

References Cited in the file of this patent

UNITED STATES PATENTS

| 2,680,766 | De Ropp et al. | June 8, 1954 |
| 3,004,062 | Kreps | Oct. 10, 1961 |

OTHER REFERENCES

Nowak et al.: Chemical Abstracts, vol. 52, p. 695–6, (1958).